July 15, 1969  H. G. YETTER  3,455,452
GRAIN SIFTER AND SEPARATOR
Filed Oct. 19, 1967  3 Sheets-Sheet 1
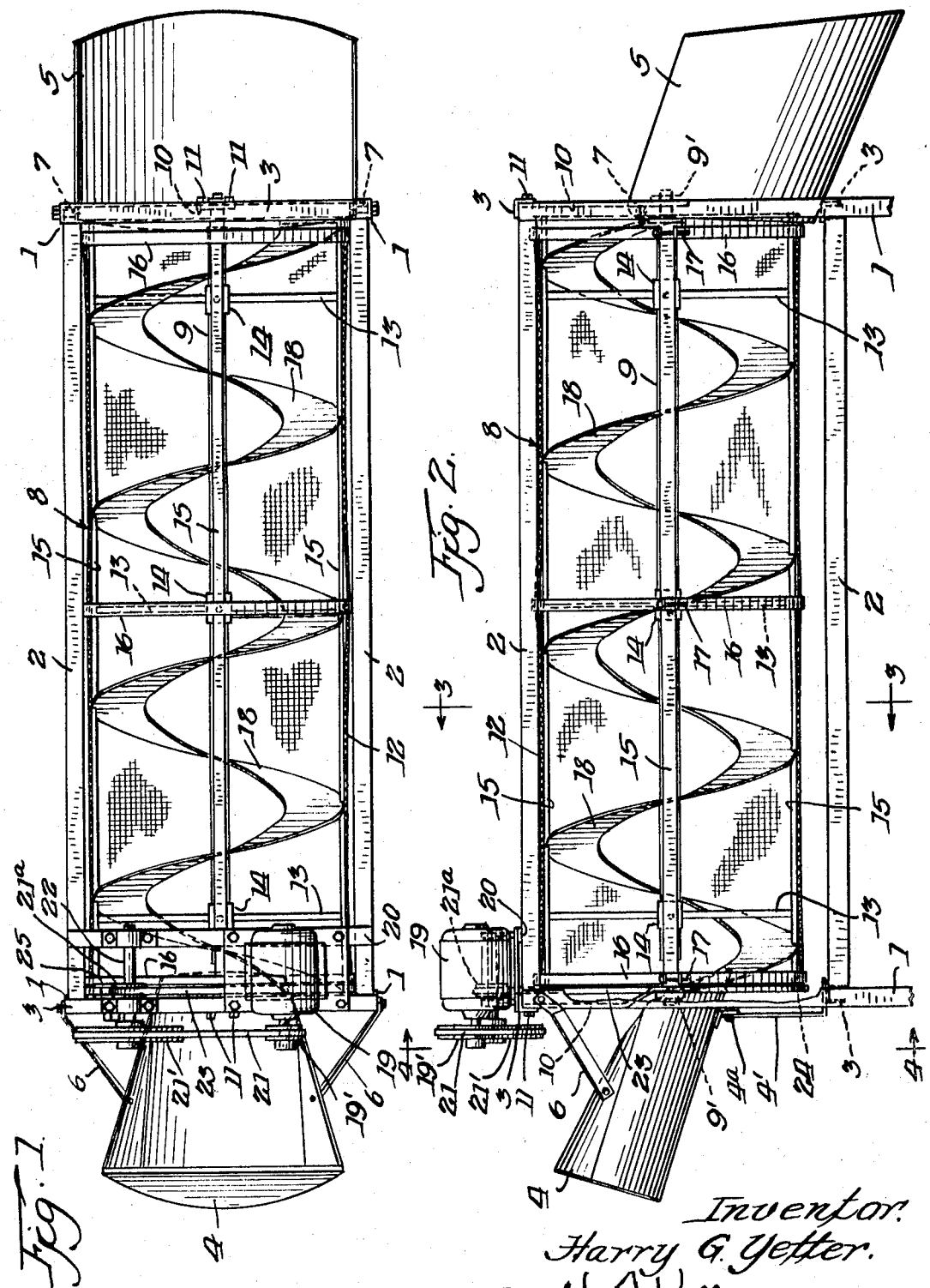
Inventor:
Harry G. Yetter.
By M. F. Kellogg
Atty.

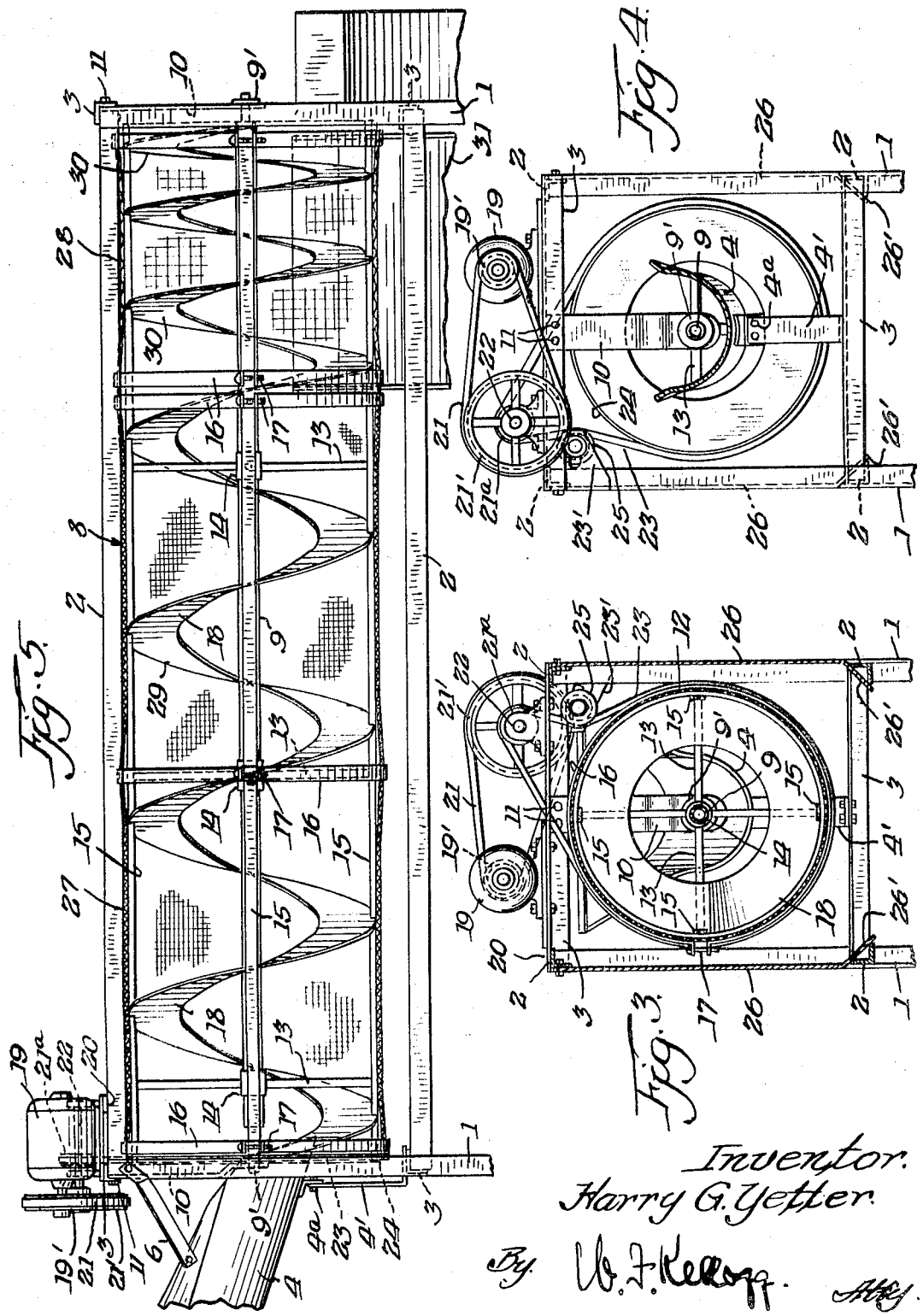

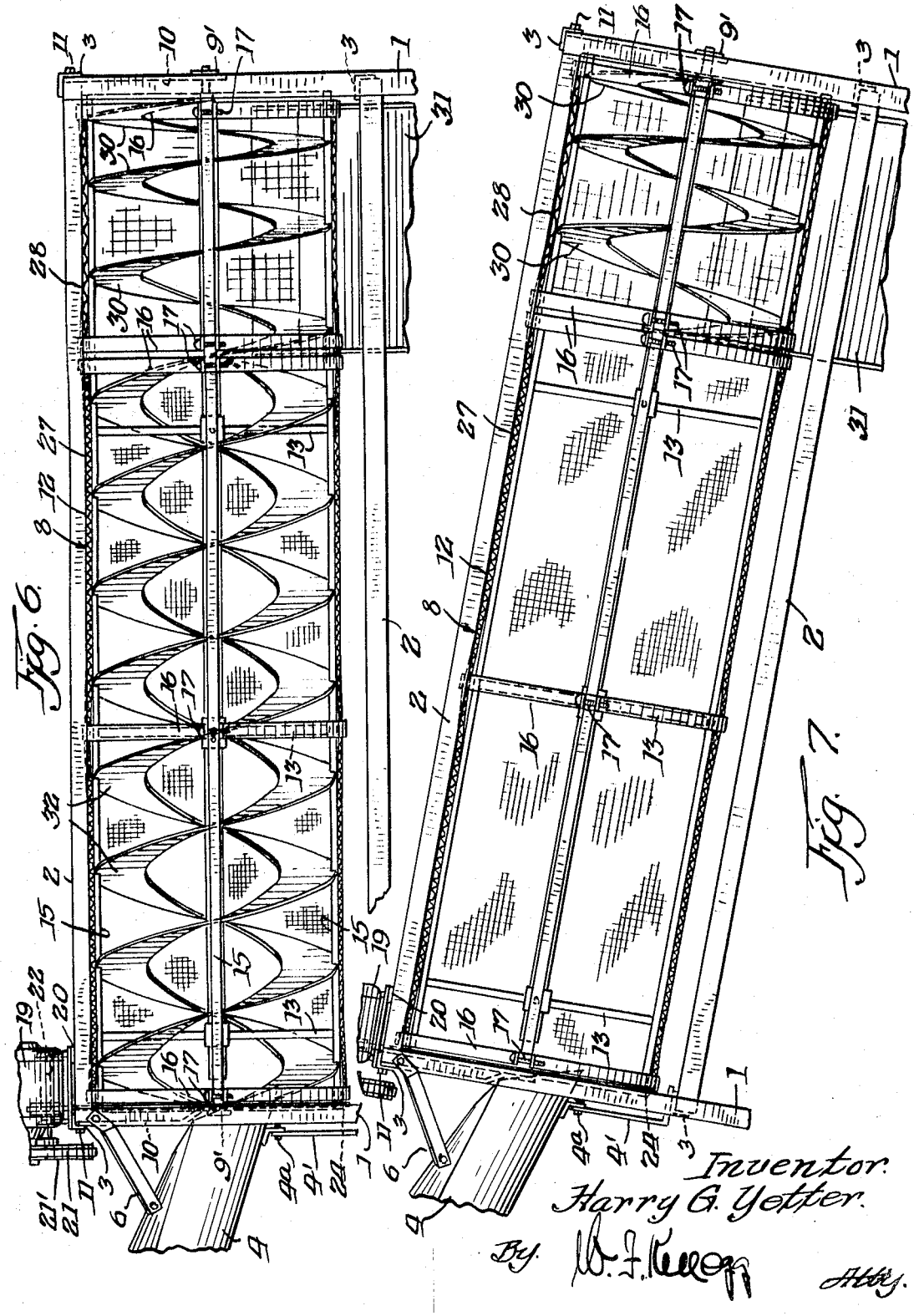

United States Patent Office 3,455,452
Patented July 15, 1969

3,455,452
GRAIN SIFTER AND SEPARATOR
Harry G. Yetter, Colchester, Ill., assignor of one-half to Joseph H. Whalen and Joan Whalen
Filed Oct. 19, 1967, Ser. No. 677,007
Int. Cl. B07b 1/24
U.S. Cl. 209—297                                   1 Claim

ABSTRACT OF THE DISCLOSURE

A machine for sifting and separating loose chaff, dross or waste materials and/or "fines" from grain, including corn kernels, having a supporting frame on which a shaft is journalled and disposed longitudinally thereof, with an open ended foraminated drum mounted thereon; a spiral flight or conveyor being within the drum adjacent its inner periphery, extending throughout its length and rotatable therewith. Those convolutions of the spiral flight or conveyor in proximity to one end of the drum are spaced closer than are the remainder whereby, with rotation, greater or stepped up agitating and separating impetus or action will be exerted on the matters engaged thereby. Gearing is provided to the drum for transmitting rotary motion thereto.

FIELD OF THE INVENTION

This invention relates to improvements in grain sifters and separators of the drum sifter, separator and conveyor type; more particularly, to machines for freeing and ridding various harvested grains, amongst others, shelled corn kernels, from and of chaff, "fines," corn cob and weed, etc., fragments and similar worthless or potentially deleterious matters whereby to assure their effectively preserved and clean storage, in that when stored, they will be thoroughly and wholly aerated, hence, prevented from packing or compacting with often times resulting fermentation or other deterioration and spoilage, as well as conserving storage area.

It is also an object of the invention to provide a machine of the stated character of such construction novelty and refinement that it may be used advantageously and beneficially for the separation of dross or waste matters from various field or soil grown products other than grains (dry or green), coffee beans, certain berries, and/or fruits, etc., and thereby improve them materially for packaging and storage in states of satisfactory preservation.

Another object of the invention is to provide a machine whose use is not limited to the sifting and separating of dross matters from grains, etc., but which may, with but slight if any modification, be used as advantageously for classifying and/or assorting various kinds of products, both edible or otherwise.

Yet another object of the invention is to provide a separator of the hereinbefore indicated kind which, in addition to its efficient, novel, simple and comparatively economical construction (employing a minimum of moving parts), is both durable and operationally dependable.

BACKGROUND OF THE INVENTION

The basic requirement underlying the successful treatment and preservation of agricultural products, i.e., grains, including shelled corn and other kernels as well as matters such as above indicated whereby with bulk or other storage thereof they will be preserved against the deterioration or spoilage, in that they will have been freed by sifting and separating chaff, dross, waste and materials commonly referred to as "fines" therefrom. Thus, when stored, the products will be continuously and effectively aerated, hence, prevented from packing or otherwise compacting with resultant damage, or becoming susceptible to the hazard of spontaneous combustion.

Heretofore, apparatuses and devices have been devised with a view toward accomplishing the aforesaid sifting and separation. They have, however, been generally unsatisfactory for a number of reasons, certain of which are faulty performance, complexity of construction and operation, cost, and lack of durability with resultant failure attributable, in the main, to the rigors to which agricultural equipment is often subjected. Thus, the need for substantial improvement remains.

SUMMARY OF THE INVENTION

In order to eliminate the above mentioned difficulties and disadvantages, the present invention has been evolved and found, by test, to be overall satisfactory, comprising a foraminated or reticulated drum-like rotatable body into one end of which shelled corn kernels or similar matters from which "fines" and other foreign bodies or pieces are to be separated, are fed and caused to be moved about, over and along the same and discharged therefrom.

The invention resides primarily in the rotatable foraminated drum-like body and the spiral or auger flight fixedly mounted therein and disposed longitudinally throughout its length adjacent and along the openings therein whereby with rotation of the drum-like body together with said flight, free flowing materials which are to be separated and are discharged thereinto will be caused to traverse the length of the body and in so doing, separated.

In a modified form of the invention the openings in the discharge end portion of the body are of sizes greater (larger) than those in its remaining and forward portion. The convolutions of the spiral flight adjacent and over its discharge end portion and the larger openings are spaced closer together than are the others thereof. Thus, with rotation of the body and spiral flight the rate of speed of longitudinal and orbital travel of grain and other matters being separated over and about the foraminated body and through the larger openings therein will be beneficially decreased and agitated or "tumbled" to an extent that they contact a greater inner peripheral area thereof, assuring their complete and thorough separation.

These and other objects and advantages of the invention will become apparent from the following description when read in conjunction with the appended claims and accompanying drawings.

In the drawings:

FIGURE 1 is a horizontal longitudinal section through the machine showing the foraminated drum-like body, rotary drive therefor, the material input and discharge chutes, and the longitudinally disposed spiral flight within the body over the openings therein and connected thereto;

FIGURE 2 is a vertical longitudinal section therethrough;

FIGURE 3 is a vertical transverse section through the machine taken on the line 3—3 of FIGURE 2 looking in the direction in which the arrows point;

FIGURE 4 is a vertical transverse section taken on the line 4—4 of FIGURE 2 looking in the direction in which the arrows point;

FIGURE 5 is a vertical longitudinal section through a modified form of the machine wherein the drum-like body is formed with separate zones of different sized openings and those convolutions of the spiral flight adjacent and over the zone of larger openings are spaced relatively closer together;

FIGURE 6 is a vertical longitudinal section through another modified form of the invention in which a double spiral flight is mounted within the drum-like body adjacent and over the zone of lesser sized openings therein, and, FIGURE 7 is a like view of still another modified form of the invention wherein the foraminated drum-like body is supported in a downwardly inclined position and the first zone of openings therein is not provided with a spiral flight, but depends on gravity for the flow or travel of matters being separated through and over the same into engagement with the spiral flight adjacent and over the larger sized zone of openings.

With continued reference to the drawings wherein like parts throughout the several figures are identified by the same reference numerals, one embodiment of a machine constructed in accordance with the instant invention comprises a supporting frame consisting of relatively longitudinally spaced pairs of length matched angle bar legs 1 permanently connected at their upper ends and therebelow by longitudinally and transversely disposed side and end angle bars 2 and 3, respectively, as shown in FIGURES 1 through 4 inclusive. Thus, a substantially box-like frame is provided. Downwardly pitched chutes 4 and 5 are fixedly mounted on and at the opposite ends of the frame, as at 6 and 7, the chute 4 being additionally supported on and by an upstanding arm 4' bolted or otherwise fastened thereto, as at 4a, serving as free-flowable matters or materials input and discharge, respectively, for the open opposite ends of the drum-like sifting and separating body indicated in its entirety by the numeral 8, hereinafter more fully described.

The drum-like sifting and separating body 8 is mounted on a shaft 9 disposed longitudinally and medially therethrough, journalled in bearings 9' carried by hanger arms 10 fixed, as at 11, to and depending from intermediate portions of the end wall bars 3 (see FIGURES 2, 3, 4). It comprises a cross-sectionally circular cylinder 12 made of wire mesh (hardware cloth) of appropriate gauge, or other suitable foraminated material, the openings in which are of the same or substantially the same size therethrough. To receive and rotatably support the circular cylinder of wire mesh or foraminated material, relatively longitudinally spaced spiders 13, each having bearing collars 14, are arranged within the same and fixedly mounted on the shaft 9. The outer ends of said spiders are connected or joined to adjacent portions of metal bars 15 within and longitudinally of the foraminated cylinder 12 thereby firmly and securely supporting the same, while to further support and strengthen it, split metal bands 16 are engaged over, about and with the same. At least one thereof is engaged about and with the foraminated cylinder adjacent and over the intermediately positioned spider, as shown in FIGURES 1 and 2. Bolts 17 are engaged with angled adjacent ends of the bands for an obvious purpose.

In order that free flowable material, such for example, as hulled corn, other grains, etc., carrying dross and "fines" when fed into the rotatable drum-like body 8, will be tumbled therein over and about its wire mesh or otherwise foraminated periphery 12 and, at the same time, move longitudinally therethrough to and from its discharge chute 5 a spiral or auger flight 18 of length and diameter substantially corresponding to that of the drum-like body 8 is positioned therein, extending from end to end thereof. The other edges of its convolutions are notched and engaged with and over adjacent portions of the bars 15, as shown in FIGURES 1 and 2. Thus, connection between the foraminated cylinder 12 and conveyor flight is effected whereby the two will be collectively rotated by the driven and supporting shaft 9.

The size of the openings in the cylinder wire mesh or other foraminated material 12 is such that the corn kernels or other grains being sifted and separated will not pass therethrough, but will pass over and along the same propelled by the spiral flight 18 into the discharge chute 5 for delivery into a receiving means, not shown. Concurrently with the described longitudinal-orbital travel of the corn kernels, etc. through and from the drum-like body, the "fines" and other particles and dross of sizes less than the size of the wire mesh openings will pass therethrough, preferably into an appropriate and suitable receiver, not shown.

To rotate the drum-like body, various forms of drives may be employed, the one herein shown consisting of a motor 19 fixedly mounted atop the aforesaid frame on bars 3 and 20 (see FIGURES 1 and 4) having its driving pulley 19' connected by an endless belt 21 to the sheave 21' on a counter-shaft 22 also mounted atop the frame in opposed and spaced relation thereto and mounting a pulley 21a on an opposite portion. A belt drive 23 is engaged about the countershaft pulley extending downwardly with and about a band 24 mounted on and securely connected to and about the apposed end of the drum-like body 8. Preferably, a belt tightening idler 25 is journalled in a bearing bracket 23' attached to an adjacent portion of the frame and contacting the belt, as shown in FIGURES 3 and 4, for an obvious purpose.

Chaff, "fines," etc. may be and are preferably confined by sheathing the sides and top of the machine frame, as at 26, the lower end portions of the sheathing sides being disposed or inwardly lipped, as at 26' to direct the same downwardly and inwardly therefrom.

In operation of the aforedescribed machine, the drum-like body 8 is rotated by the energized motor 19 through the belt gearing 21–23, the latter being engaged with and about the body mounted band 24. Thereupon, corn kernels together with "fines," cob fragments and other materials to be separated therefrom are fed by appropriate means via the input chute 4 into the adjacent open end of the rotating body. Being so charged, the material is engaged and moved by the spiral flight in tumbling fashion about, over and longitudinally through said body, i.e., its wire mesh or otherwise foraminated peripheral shell or wall 12, during which movement the "fines" and other materials of size less than the size of the openings in the peripheral shell or wall will be sifted downwardly therethrough and received in a suitable receptacle therebelow. The corn kernels of larger sizes, conveyed by the spiral flight, are moved over the foraminated body wall and are discharged from its remaining open end onto the discharge chute 5 for ultimate conveyance to and storage in suitable medium.

Whereas I have referred specifically to the separation of corn kernels from "fines" etc., it will be understood and appreciated that various other forms of grains may be treated by the improved machine though in such usages, it will probably be required that the foraminated material shall have body peripheral openings of different sizes, this according to the character and size of the material or materials to be treated.

Reference is now directed to the FIGURE 5 of the drawings. In the construction here shown, the drum-like body, again identified by the reference numeral 8, is provided with a peripheral shell or wall constructed of wire mesh (hardware cloth) or other foraminated material in which the openings in the forward or substantially forward portion thereof are of sizes or gauge less than are those in its rearward or substantially rearward portion, as indicated, respectively, by the reference numerals 27 and 28. It is preferable that the length of the portion 27 of the body shell or wall having the smaller sized openings therein shall be greater than the remainder thereof, e.g., the portion 28 having larger openings therein.

A spiral or auger flight 29 is mounted in and rotatable with the drum-like body in a manner corresponding to the previously described form of the invention. It differs, however, in that the centers of its convolutions adjacent, over and along the portion 28 of the foraminated body wall are formed progressively closer together as they approach the open discharge end thereof, as indicated by the reference numeral 30.

A concaved chute 31 is supported below and longitudinally of the lower side of the portion 28 of the drum-like body and serves to receive corn kernels discharged or sifted therefrom for delivery into a suitable receiving medium (not shown).

Referring now to the further modified form of the invention shown in FIGURE 6, instead of employing a single spiral or auger flight, such as indicated by the numeral 29, a double one, indicated by the numeral 32, may be substituted therefor. The double portion of this spiral is limited in its length to the length of the portion 27 of the wire mesh or otherwise foraminated drum-like wall 12. With rotation thereof a materially greater tumbling and orbital agitation and travel of the engaged and longitudinally conveyed material will be effected, assuring complete separation of "fines" from the corn kernels which are sifted through the larger openings in the peripheral shell or wall portion 28 of the drum-like body.

It is here particularly noted, as respects the modified forms of the invention shown by the FIGURES 5 and 6, that the progressively or successively closer convolutions 30 of the spiral flight will, to an advantageous extent, decrease the rate or speed of longitudinal travel of the corn kernels over and through that portion of the foraminated drum-like body 8 indicated by the reference numeral 28; furthermore, that the tumbling and orbital movement and agitation thereof over and about the body will be increased materially. Thereby, a thorough or complete separation of the kernels from the larger dross matters, i.e., cob fragments, etc. will be assured, such dross material being discharged from the open end of the body for suitable disposal for possible use.

Reference is now made to the further modified form of the invention as shown in FIGURE 7. The construction herein shown includes the form of drum-like body 8 shown in FIGURES 5 and 6 with its foraminated portions 27 and 28 having different sized openings or perforations. Also, the rotatable mounting and drive of and for the drum-like correspond to that previously described.

Instead of the level mounting of the drum-like body 8, as is effected in the preceding embodiments of the invention, it is mounted or set on an incline by means of suitable supports or legs 1—being inclined downwardly at the desired or required angle from its open material input end to its open discharge end.

That portion of the peripheral wall of the drum-like body having the openings or perforations of lesser size, as indicated at 27, is without the spiral or auger flight herein described. However, the foraminated or perforate portion 28 of said peripheral wall is formed with openings larger than those in the preceding portion. Also, a longitudinally disposed spiral or auger flight 30 is mounted within and rotatable with the shell-like body, extending completely over its perforated peripheral wall and connected to adjacent portions of the body frame and wall supporting bars 15. It is preferable that this spiral or auger flight 30 has its convolutions arranged or disposed progressively closer together, as in the instance of the hereinbefore described spiral flight convolutions.

In operation of the form of machine illustrated by the FIGURE 7, hulled corn kernels together with extraneous material are fed into the upper and input end of the body 8 via the chute 4. Moving by gravity through the now rotating foraminated body, the thus charged materials will move downwardly therethrough. The "fines" or matters of sizes less than the openings 27 in the body pass therethrough and, of course, are collected in a suitable manner, while the residuals of the materials continue on in their downward travel into engagement with the rotating spiral flight 30 and will be tumbled over and about the entire area of its perforated peripheral wall, resulting in the passage or sifting of corn kernels through the openings 28 and discharged via a chute 31 into a suitable receiving medium; the residuals (dross, etc.) being discharged from the lower and open discharge end of the body.

Whereas I have, in the preceding description of the invention and its different modified forms described the same as being used for the separation of hulled corn kernels from "fines" and dross materials, it is, as hereinbefore stated, to be understood that the machine is as equally advantageous for use for separating various grains from "fines" and dross materials; moreover, that it is not limited to such usages, but may be also employed for the separation of various granular, particulated and free flowing matters or products, both edible and nonedible.

I claim:
1. A machine for sifting and separating substantially dry matters of different characters and sizes, comprising:
   (a) a supporting frame having spaced shaft bearings thereon;
   (b) a shaft disposed longitudinally of and through the frame having its opposite ends journalled in the bearings;
   (c) a plurality of relatively spaced supporting spiders mounted on the shaft;
   (d) supporting bars disposed longitudinally of the frame connected to and supported by the spiders;
   (e) a foraminated shell-like matter sifting and separating body having endwise opposed matter receiving and discharge ways received over and about and connected to said bars;
   (f) the openings in that portion of the foraminated body in proximity to the matter discharge way being of size greater than those in the remaining foraminated portion thereof;
   (g) a continuous spiral flight within and extending throughout the length of said body over the openings therein having outer portions of its convolutions adjacent and connected to said bars and rotatable therewith;
   (h) the distances between the centers of those convolutions of the spiral flight adjacent and over the openings of greater size in said portion of the foraminated body being successively decreased toward the discharge way of said matter sifting and separating body;
   (i) a discharge chute supported on the frame disposed transversely of its longitudinal axis below and communicating with and completely spanning that portion of the foraminated body having the openings of greater size therein, and
   (j) rotary motion transmitting drive means on the frame connected to the shell-like matter sifting and separating body.

References Cited
UNITED STATES PATENTS

| 2,451 | 2/1842 | Hort | 209—297 |
| 848,270 | 3/1907 | Stanton | 209—297 |
| 945,174 | 1/1910 | Larson | 209—297 |
| 1,387,238 | 8/1921 | Cave | 209—297 |
| 1,666,370 | 4/1928 | Detwiler | 209—297 |
| 1,743,833 | 1/1930 | Stall | 209—297 |
| 2,047,808 | 7/1936 | Trimbey | 209—297 X |

TIM R. MILES, Primary Examiner